United States Patent

[11] 3,572,920

[72] Inventor Rolf Heinzmann
 Schmiden, Germany
[21] Appl. No. 851,168
[22] Filed Sept. 19, 1969
[45] Patented Mar. 30, 1971
[73] Assignee Robert Bosch Elektronik Und Photokino GmbH
 Stuttgart-Unterturkheim, Germany
[32] Priority Aug. 20, 1968
[33] Germany
[31] P 17 97 132.3

[54] PROJECTOR FOR PHOTOGRAPHIC TRANSPARENCIES
 11 Claims, 3 Drawing Figs.
[52] U.S. Cl. ..................................................... 353/103, 353/114, 353/122
[51] Int. Cl. ..................................................... G03b 23/02
[50] Field of Search ........................................... 353/103, 114, 115, 116, 117, 118, 88, 92, 122

[56] References Cited
UNITED STATES PATENTS

| | | | |
|---|---|---|---|
| 2,949,814 | 8/1960 | Boughton et al. | 353/92 |
| 2,979,987 | 4/1961 | Brumler et al. | 353/116 |

*Primary Examiner*—Leonard Forman
*Assistant Examiner*—Steven L. Stephan
*Attorney*—Michael S. Striker ABSTRACT: A slide projector wherein the slide changer is reciprocable between two end positions and through a median position in which a slide which is transported by the slide changer from the tray to projection position begins to open a diaphragm. The drive for the slide changer comprises a disengageable coupling which yields when the slide changer offers excessive resistance to movement in a direction to place a slide into projection position. A manually operable blocking device intercepts the slide changer before the latter reaches its median position so that the coupling is then disengaged and the slide which is pushed by the slide changer cannot reach its projection position and cannot open the diaphragm.

INVENTOR
ROLF HEINZMANN
BY Michael S. Striker
HIS ATTORNEY

PROJECTOR FOR PHOTOGRAPHIC TRANSPARENCIES

CROSS-REFERENCE TO RELATED APPLICATION

A somewhat similar slide projector is disclosed in the copending application Ser. No. 799,558, filed on Feb. 17, 1969 by Helmut Rube, and assigned to the same assignee.

BACKGROUND OF THE INVENTION

The present invention relates to projectors for photographic transparencies, commonly known as slides, and more particularly to improvements in slide projectors wherein a diaphragm normally prevents projection light from reaching the screen and is moved to open position only when or shortly before a slide assumes the projection position in which light issuing from the projection lamp can pass therethrough and toward the screen.

It is already known to provide the slide changer of a slide projector with a motion transmitting member which can open the diaphragm in its operative position. The motion transmitting member is movable relative to the slide changer between such operative and an inoperative position. When the operator decides to move or to maintain the motion transmitting member in inoperative position, the slide changer transports a slide to and from projection position but the diaphragm remains closed so that the image of the slide is not projected onto the screen. A drawback of such projectors is that the installation of the motion transmitting member and of parts which can change the position of this member involves considerable expense and also that the motion transmitting member cannot be employed in all types of slide projectors, for example, in projectors where the diaphragm is opened by way of a slide while the latter travels toward projection position.

It is also known to provide the drive which reciprocates the slide changer in a slide projector with a disengageable or yieldable coupling which can transmit to the slide changer motion until and unless the latter offers a predetermined resistance. Such couplings are employed to prevent damage to the slide changer and/or to slides when a slide happens to be misaligned or when the slide changer meets an unexpected obstruction which hinders its movement in a direction to move the slide to the projection position. The coupling is automatically reengaged as soon as the obstruction is removed or the position of a misaligned slide corrected.

SUMMARY OF THE INVENTION

An object of the invention is to provide a slide projector of the type which embodies the aforementioned coupling with a novel and improved blocking device which enables the operator to skip one or more slides if the projection of images of such slides is not desired.

Another object of the invention is to provide a blocking device which can be installed in a slide projector of the just outlined character with minimal expenditures and which occupies little room in and/or on the housing of the slide projector.

A further object of the invention is to provide a blocking device which can be rendered ineffective in a fully automatic way as soon as the drive for the slide changer is set in motion upon completion of the cycle which would have resulted in projection of the skipped slide.

An additional object of the invention is to provide a slide projector wherein the aforementioned blocking device cooperates with the coupling in a novel and improved way to enable the operator to skip one or more slides without necessitating removal of such slide or slides from the tray and without influencing the mechanism which transports the tray to place successive slides into the range of the slide changer.

The improved slide projector comprises a housing which accommodates a slide changer movable between two end positions and through a median position to normally transport successive slides to projection position during successive travels from one to the other position, drive means for moving the slide changer and including a yieldable coupling whose parts can be mounted on the slide changer and which normally drives the slide changer during movement from the one to the other end position, diaphragm means movable from a normal sealing position in which it prevents light emitted by the projection lamp from reaching the screen, motion transmitting means (preferably consisting of or including that slide which travels from the tray toward projection position) operative to move the diaphragm means away from sealing position in response to movement of the slide changer from the median to the other end position, and blocking means including a blocking member movable by hand to an operative position in which it intercepts the slide changer while the latter receives motion from the coupling and before the slide changer reaches its median position so that the coupling yields and the diaphragm remains in sealing position.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENT

Figure 1:
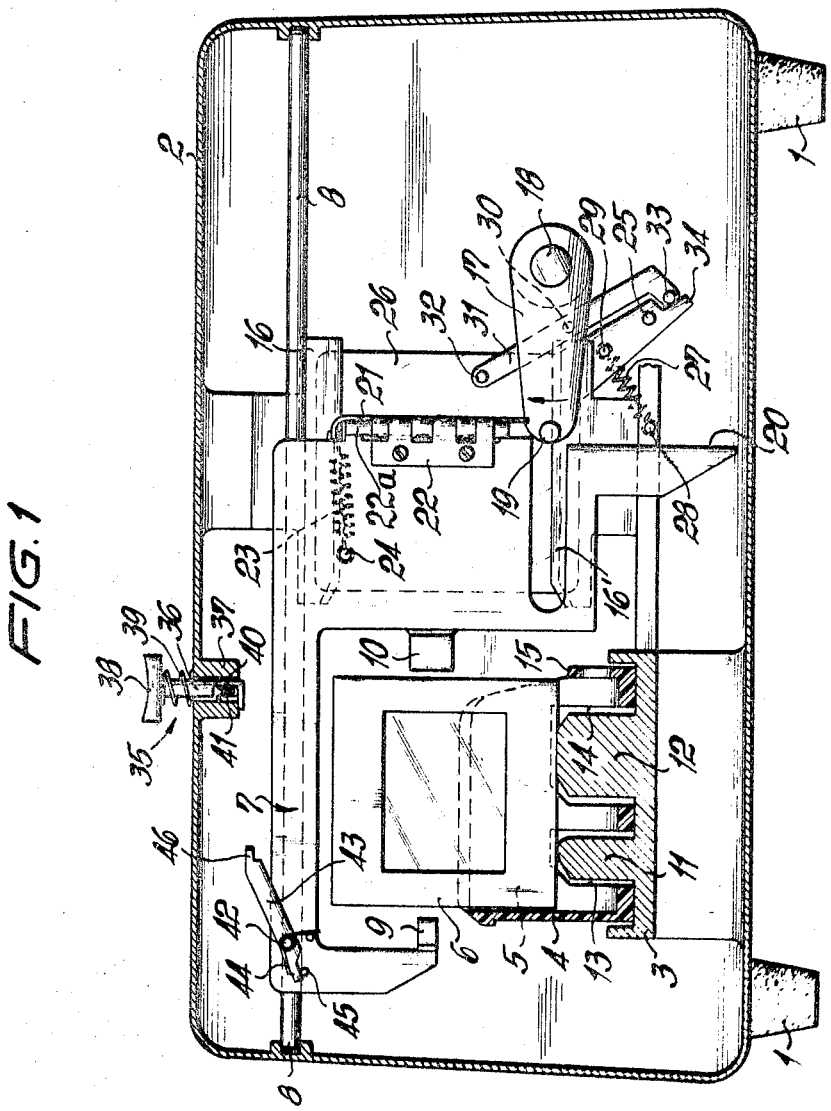
FIG. 1 is a transverse vertical sectional view of a slide projector which embodies the invention.

Referring first to FIG. 1, there is shown a projector which comprises a housing 2 having legs 1 and provided with a track 3 for a magazine or tray 4 which contains a series of slides 6. The tunnel which is formed in the housing for the track 3 is open at its forward and rear ends and the tray 4 is normally introduced from the rear and is thereupon advanced stepwise so as to place successive slides 6 into a first or transfer position occupied by the slide shown in the left-hand position of FIG. 1. The tray 4 includes customary transverse partitions 5 which define narrow compartments for the slides 6.

A slide changer 7 serves to transport slides 6 from the transfer position to a projection position in which the transparent portion of the slide extends across the path of light issuing from the projection lamp so that the image is projected onto a screen, not shown. The slide changer 7 is reciprocable along a horizontal guide rod 8 which is mounted in the sidewalls of the housing 2 and extends at right angles to the longitudinal direction of the track 3. The slide changer 7 comprises a first arm 9 which can move slides 6 from the transfer position to projection position and a second arm 10 which can return slides from projection position into the corresponding compartments of the tray 4.

The track 3 is formed with customary ramps 11, 12 which respectively extend into complementary longitudinal recesses or cutouts 13, 14 in the bottom wall of the tray 4. The recesses 13, 14 communicate with the compartments between the partitions 5, and the ramps 11, 12 slope gradually forwardly and upwardly and thereupon downwardly so that successive slides 6 are lifted to a level above a sidewall 15 of the tray 4 whereby the slide which reaches the illustrated transfer position can be withdrawn from its compartment by the arm 9 when the slide changer 7 moves in a direction to the right and away from the end position shown in FIG. 1.

The housing 2 accommodates two parallel horizontal guide rails 16, 16' which are respectively located above and below the projection gate and are provided with suitably configurated channels for the upper and lower marginal portions of frames of the slides 6. The left-hand ends of the rails 16, 16' can receive the leading portion of a slide which is being removed from its compartment by the arm 9 of the slide changer 7. Such slide thereupon moves along the channels of the rails 16, 16' and ultimately reaches the projection position in front of the projection lamp, not shown. The surfaces surrounding the channels in the rails 16, 16' are preferably roof-shaped.

The drive means for reciprocating the slide changer 7 along the rod 8 includes a shaft 18 which is intermittently driven by an electric motor (not shown) or another suitable prime mover, a crank arm 17 which is affixed to the shaft 18, and a crank pin 19 provided on the arm 17 and arranged to orbit about the axis of the shaft 18. The motor which drives the shaft 18 is preferably installed in the interior of the housing 2 and the crank pin 19 cooperates with two different parts, namely, with an edge face 20 of the slide changer 7 which is engaged by the pin 19 when the slide changer transports a slide from projection position back into the corresponding compartment of the tray 4 and a flap 21 which forms part of a yieldable or disengageable coupling and is engaged by the pin 19 when the slide changer is to transport a slide from the tray 4 toward and into the projection position. The shaft 18 rotates in a clockwise direction as indicated by the arrow. Of course, a fresh slide 6 is moved to projection position during the interval when the crank pin 19 moves away from engagement with the edge face 20 and toward engagement with the flap 21. The latter is pivotably secured to the slide changer 7 by a vertical pintle 22a which forms part of a hinge 22. A helical spring 23 has one of its ends attached to a post 24 on the slide changer 7; its other end is coupled to the flap 21 so that the latter tends to assume the illustrated operative position in which it extends into the path of orbital movement of the crank pin 19. When the resistance which the slide changer 7 offers to movement with the crank pin exceeds a predetermined value, the spring 23 yields and permits the flap 21 to pivot on the pintle 22a so that the pin 19 continues its orbital movement but the slide changer 7 remains in a median position. The flap 21 constitutes a leaf of the hinge 22 and this hinge, together with the spring 23, constitutes a disengageable coupling which forms part of the drive means and can transmit to the slide changer 7 movement until and unless the latter offers a predetermined resistance to such movement. A suitable stop, not shown, is provided on the slide changer 7 to arrest the flap 21 in the illustrated operative position when the spring 23 is free to contract.

The slide projector further comprises a pivotable diaphragm or mask 26 which normally overlies the projection gate to prevent illumination of the screen when the projection gate is empty, i.e., when there is no slide in the projection position. This diaphragm is a plate which is fulcrumed in the housing 2, as at 25, and is biased to sealing position by a helical spring 27 which is coupled to a post 28 in the housing 2 and a second post 29 of the diaphragm 26. The latter overlies the projection gate during travel of slides between projection and transfer positions and opens shortly before a slide reaches the projection position. The means for pivoting the diaphragm 26 to open position comprises a two-armed motion transmitting lever 31 which is turnable on a pivot pin 30 of the housing 2 and the upper arm of which carries a motion receiving pin 32 extending into the path of movement of a slide 6 which is being advanced toward projection position. The lower arm of the lever 31 carries a second pin 33 which abuts against an extension 34 at the lower end of the diaphragm 26. When a slide 6 advances toward its projection position, the leading edge of its frame engages the pin 32 shortly before the slide reaches the projection position whereby the lever 31 turns in a clockwise direction and its pin 33 turns the diaphragm 26 in the same direction so that the diaphragm permits light emitted by the projection lamp to pass through the transparent portion of the slide which reaches the projection position. The spring 27 stores energy during movement of the diaphragm 26 from sealing to open position.

The projector further comprises a novel blocking device 35 which can be manipulated by hand and serves to prevent the transport of selected slides 6 from transfer position to projection position. Thus, the blocking device 35 can insure that the diaphragm 26 remains in sealing position during a full revolution of the crank pin 19 when the tray 4 maintains in the transfer position that slide which the operator of the projector does not wish to show to the audience. This is achieved by constructing the blocking device 35 in such a way that it can hold the slide changer 7 in a median position so that the flap 21 yields when engaged by the crank pin 19 and the latter merely turns without effecting any further rightward displacement of the slide changer to its second end position. The arrangement is preferably such that the slide changer 7 can leave the illustrated end position but that it cannot advance a slide 6 so close to its projection position that the frame of such slide would cause the diaphragm 26 to leave its sealing position.

Figure 2:
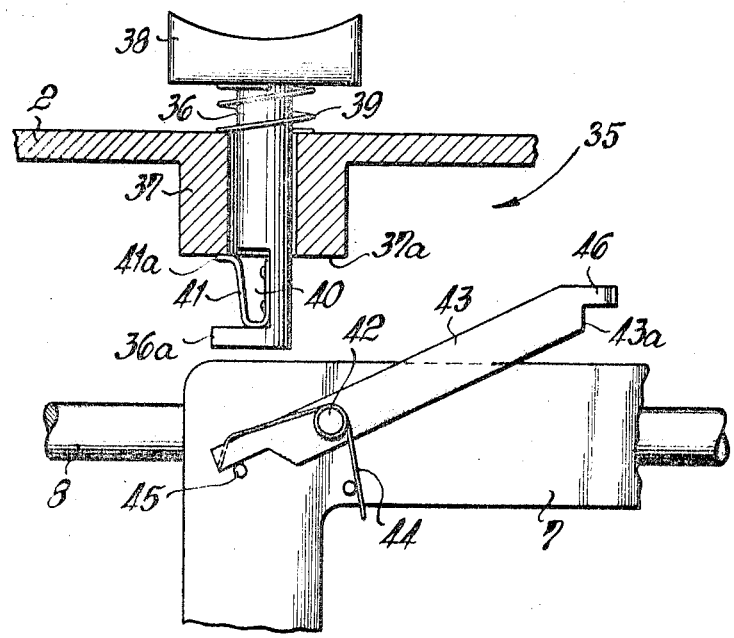
FIG. 2 is an enlarged view of a detail in the projector of FIG. 1, showing the blocking device for the slide changer in operative position.
Figure 3:
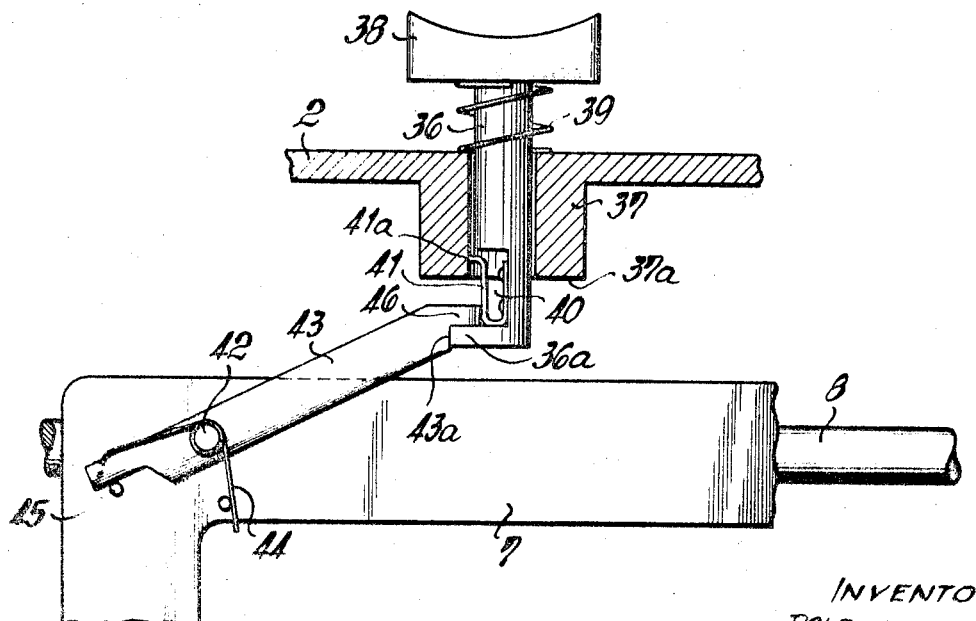
FIG. 3 illustrates the structure of FIG. 2 but showing the slide changer in engagement with the blocking member.

The blocking device 35 is best shown in FIGS. 2 and 3. It comprises a depressible blocking member or stud 36 which is guided in a sleeve 37 provided therefor in the top wall of the housing 2. The stud 36 has a manually depressible head 38 which is accessible from the outside of the projector and can move at right angles to the guide rod 8. A helical return spring 39 surrounds the upper part of the stud 36 and tends to maintain it in the raised or extended position shown in FIG. 1. The stud 36 cannot rotate in the sleeve 37 and its lower end portion is L-shaped to form a hook 36a. When in the extended position of FIG. 1, the hook 36a of the stud 36 abuts against the bottom surface 37a of the sleeve 37. The notch 40 above the hook 36a accommodates a leaf spring 41 which constitutes the yieldable element of a detent device further including the sleeve 37 and serving to releasably hold the stud 36 in depressed or operative position against the opposition of the return spring 39. The leaf spring 41 has a bent over free end portion or tongue 41a which moves to the left, as viewed in FIG. 3, when the stud 36 is depressed to thereby engage the bottom surface 37a of the sleeve 37 and to thus hold the stud 36 in operative position. An important advantage of the leaf spring 41 is that the operator need not continue to press the head 38, i.e., it suffices to merely depress and to thereupon release the head 38 as soon as the tongue 41a moves to a level below the bottom surface 37a.

The blocking device 35 further comprises a two-armed release lever 43 which is turnable on a horizontal pivot pin 42 of the slide changer 7 and is biased by a torsion spring 44 so that its left-hand arm normally abuts against a stop 45 on the slide changer (see FIG. 2). The right-hand arm of the lever 43 is provided with a bent over projection 46 which can enter the notch 40 and can disengage the tongue 41a from the sleeve 37 so that the return spring 39 is then free to contract and to move the stud 36 to a somewhat different operative position shown in FIG. 3. The upper arm of the lever 43 has a vertical shoulder 43a which can engage the adjoining vertical edge portion of the hook 36a when the stud 36 assumes the operative position of FIG. 3. The stud 36 is free to reassume its extended or inoperative position shown in FIG. 1 when the crank pin 19 engages the edge face 20 and moves the slide changer 7 to the left, as viewed in FIG. 3, so as to withdraw the projection 46 from the notch 40 and to thus permit complete expansion of the return spring 39.

THE OPERATION

When the projector is idle, the crank pin 19 assumes the angular position shown in FIG. 1 in which the slide changer 7 dwells in its left-hand end position and is ready to transport a slide 6 from transfer position to projection position. If the operator thereupon starts the motor which rotates the shaft 18, the crank pin 19 engages the flap 21 and moves the slide changer 7 in a direction to the right so that the arm 9 engages the frame of the slide 6 and transports such slide into the channels of the guide rails 16, 16' whereby the slide ultimately reaches its projection position. Shortly prior to reaching such position, the slide engages the pin 32 of the lever 31 and causes the latter to pivot the diaphragm 26 in a clockwise direction so that the diaphragm permits observation of image on the slide which is located in the projection position. It is clear that, instead of pivoting the diaphragm 26 by way of the slide 6 and lever 31, the projector may be equipped with different motion transmitting means mounted on the slide changer 7 or on a part which moves with the slide changer, such motion transmitting means serving to move the diaphragm to open position only when the slide changer 7 is permitted to move all the way to the left, i.e., when the coupling including the flap 21 is not disengaged to permit the slide changer to dwell in a median position without actually placing a slide into projection position. The ramps 11, 12 maintain the slide 6 which assumes the transfer position at a level above the sidewall 15 of the tray 4 so that such slide can readily travel above the wall 15 and is aligned with the rails 16, 16'.

The crank pin 19 moves beyond the flap 21 as soon as a slide 26 reaches the projection position. The motor which drives the shaft 18 is thereupon arrested, preferably automatically, for example, by opening a switch which is installed in the motor circuit and is located in the path of movement of the pin 19 and/or arm 17.

If the projector is not equipped with an automatic timer, the image of the slide in projection position is projected onto the screen as long as the motor remains idle. Such slide is moved away from projection position in response to manual completion of the motor circuit whereby the pin 19 engages the edge face 20 and causes the slide changer 7 to leave the right-hand end position and to move back toward the end position shown in FIG. 1. The arm 10 of the slide changer pushes the slide from projection position back into the corresponding compartment of the tray 4. The latter is thereupon advanced by a step in the customary way so as to locate the next-following slide in transfer position. All this takes place while the pin 19 moves away from engagement with the edge face 20 and toward engagement with the flap 21. Of course, as the arm 10 pushes a slide from projection position, the frame of such slide permits the spring 27 to contract and to return the diaphragm 26 to sealing position shortly after the slide changer 7 begins to move in response to engagement of the pin 19 with the edge face 20. This insures that the screen remains unilluminated during transport of slides between the tray 4 and projection position.

As stated above, the tray 4 is advanced by a step after the just returned slide reenters its compartment and while the crank pin 19 travels from the edge face 20 toward the flap 21. As a rule, the mechanism for advancing the tray 4 comprises a rack at the underside of the tray and a pinion which meshes with the rack and is indexed by the slide changer 7 or by a part which moves with the slide changer during the last stage of movement of the arm 9 toward the position shown in FIG. 1. If the slide which has been moved to transfer position is one of those which should not be shown to the audience, the operator depresses the head 38 of the stud 36 of the blocking device 35 during return movement of the preceding slide 6 toward transfer position, i.e., back into the corresponding compartment of the tray 4. The head 38 should be depressed to such an extent that the tongue 41a of the detent spring 41 moves to a level below the bottom surface 37a of the sleeve 37. The spring 41 then expands and the tongue 41a engages the sleeve 37 (see FIG. 2) to maintain the stud 36 in the operative position. As the slide changer 7 travels toward the end position shown in FIG. 1, the upper arm of the release lever 43 engages the hook 36a and the torsion spring 44 yields to thus permit the lever 43 to bypass the stud 36. The spring 44 causes the lower arm of the lever 43 to return into abutment with the stop 45 as soon as the projection 46 of the lever 43 moves beyond the stud 36. Such bypassing of the stud 36 by the lever 43 does not terminate the arresting action of the tongue 41a, i.e., the latter remains in engagement with the bottom surface 37a of the sleeve 37.

When the slide changer 7 thereupon begins to leave the end position shown in FIG. 1 and its arm 9 pushes the slide which should not be exhibited away from transfer position, the projection 46 of the lever 43 enters the notch 40 of the stud 36 and deforms the spring 41 so that the tongue 41a moves to the right, as viewed in FIG. 2, and the spring 39 is free to expand slightly so as to withdraw the tongue 41a into the bore of the sleeve 37. However, the stud 36 cannot reassume its extended position because the projection 46 engages the hook 36a in a manner as shown in FIG. 3. In this second operative position, the stud 36 maintains the left-hand edge face of its hook 36a in engagement with the shoulder 43a of the lever 43 so that the slide changer 7 is positively held against further movement away from the tray 4. The slide changer 7 is intercepted by the stud 36 before the slide 6 which is engaged by its arm 9 can reach the pin 32 of the lever 31 so that the diaphragm 26 remains in sealing position. Since the motor continues to drive the crank pin 19 while the latter bears against the flap 21, the flap yields by stressing the the spring 23 so that the pin 19 continues its orbital movement without completing the movement of the slide from transfer position to projection position. The motor is then arrested in the aforedescribed manner and, when the operator thereupon again completes the motor circuit, the crank pin 19 engages the edge face 20 and begins to move the slide changer 7 from the median position shown in FIG. 3 back toward the left-hand end position shown in FIG. 1. This causes the lever 43 to withdraw its projection 46 from the notch 40 of the stud 36 whereby the return spring 39 is free to expand and to move the stud and its head 38 to the fully extended position of FIG. 1. Of course, if the operator wishes to conceal the next-following slide too, the head 38 is depressed during movement of the slide changer 7 back to the end position of FIG. 1 so that the projection 46 reengages the spring 41 during the next-following movement of the slide changer away from the tray 4. In this way, the operator can conceal as many slides as he or she wishes. If only one slide is to be skipped, the head 38 of the stud 36 is left untouched after the first depression whereby the blocking device 35 becomes inoperative in automatic response to return movement of the slide changer 7 from the median position of FIG. 3 to the end position shown in FIG. 1.

An important advantage of the improved blocking device 35 is its relative compactness and simplicity. This is attributed to the fact that this blocking device cooperates with the coupling 21—24 of the drive for the slide changer 7, i.e., with a component which is normally provided in the slide projector irrespective of the presence or absence of means which enables the operator to skip one or more slides. Also, the novel and improved manner in which the blocking device 35 cooperates with the coupling 21—24 is not affected by the fact that the diaphragm 26 can be moved from sealing position by the slides 6 or by any other part or parts which share the movements of or move in synchronism with the slide changer 7 while the latter travels from the median position toward the right-hand end position, as viewed in FIG. 1, i.e., from the position in which the diaphragm begins to open to the position in which the diaphragm is open and a slide normally occupies the projection position.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended.

I claim:

1. In a slide projector, a combination comprising a slide changer movable between two end positions and through a median position; drive means for moving said slide changer and including a yieldable coupling which normally drives the slide changer during movement from one to the other end position but can yield if said slide changer is blocked; diaphragm means movable from a normal sealing position in which it prevents projection light from reaching the screen to an open position; motion transmitting means operative to move said diaphragm means from said sealing position to said open position during movement of said slide changer from said median to said other end position; and blocking means including a blocking member movable by hand to an operative position in which the blocking member intercepts said slide changer while the latter receives motion from said coupling and before the slide changer moves beyond said median position so that said coupling yields and the diaphragm means remains in its sealing position while the changing cycle is completed.

2. A combination as defined in claim 1, wherein said blocking means further comprises detent means for releasably holding said blocking member in its operative position.

3. A combination as defined in claim 2, wherein said blocking means further comprises release means for rendering said detent means ineffective in response to movement of said slide changer from said one end position.

4. A combination as defined in claim 3, wherein said release means comprises a retaining member operative to engage said blocking member in response to movement of said slide changer from said one end position to thereby retain the blocking member in operative position.

5. A combination as defined in claim 4, wherein said blocking means further comprises resilient means arranged to move said blocking member away from operative position when said detent means is ineffective and in response to movement of said slide changer to said one end position.

6. A combination as defined in claim 2, wherein said detent means comprises a sleeve reciprocably accommodating said blocking member and a detent spring provided on said blocking member and engaging said sleeve in response to movement of the blocking member to its operative position.

7. A combination as defined in claim 6, wherein said blocking means further comprises a return spring arranged to bias said blocking member away from said operative position.

8. A combination as defined in claim 7, wherein said blocking means further comprises a release lever pivotally mounted on said slide changer and arranged to engage said blocking member when it is in its operative position while said slide changer moves from said one end position.

9. A combination as defined in claim 8, wherein said release lever comprises a projection and said blocking member is provided with a notch which receives said projection during movement of the slide changer from said one end position when said blocking member is in its operative position.

10. A combination as defined in claim 9, wherein said projection is arranged to disengage said detent spring from said sleeve in response to entry into said notch so that said lever thereupon holds the blocking member in operative position against the opposition of said return spring.

11. A combination as defined in claim 8, wherein said release lever is yieldably mounted on said slide changer so that it can bypass said blocking member during movement of the slide changer to said one end position and while said blocking member dwells in its operative position.